Jan. 9, 1945. R. C. RIKE ET AL 2,367,055

FUEL SYSTEM

Filed Aug. 31, 1942 2 Sheets-Sheet 1

Inventors
Richard C. Rike &
Everett L. Baugh
By
Attorneys

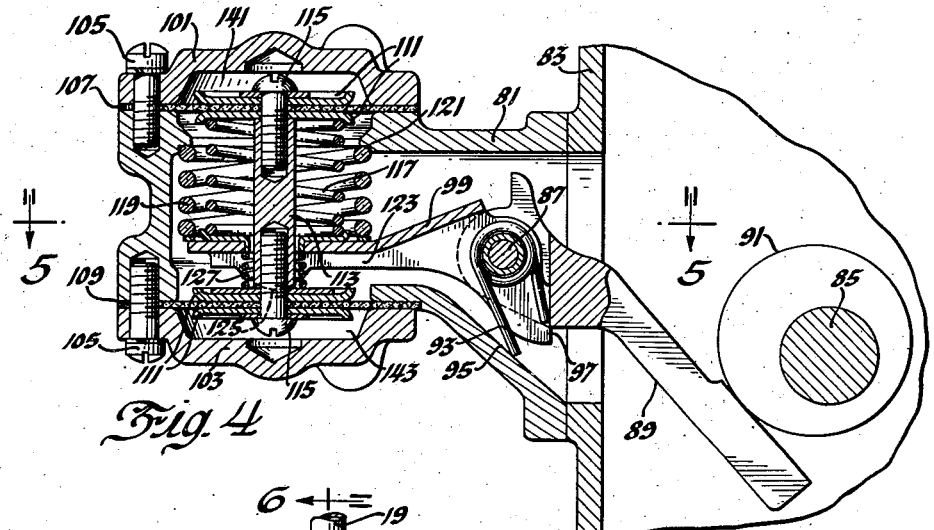
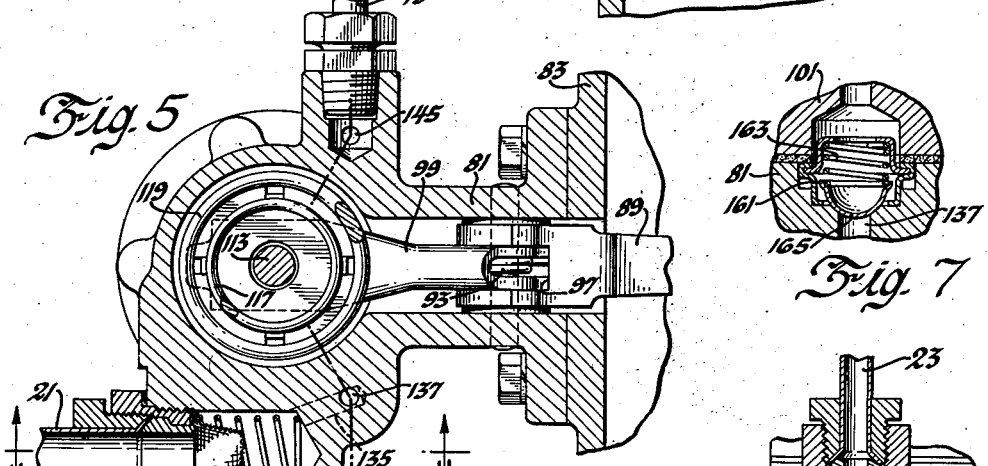
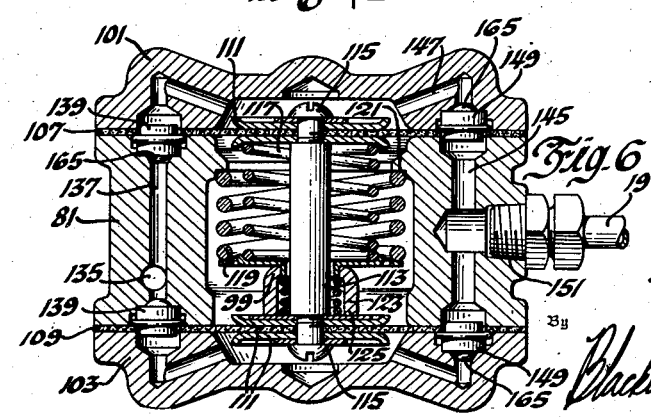
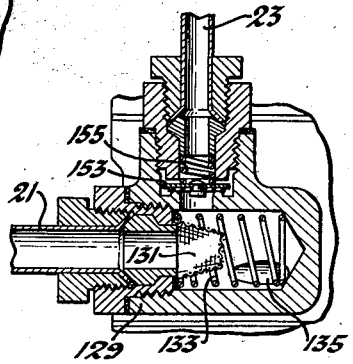
Inventors
Richard C. Rike &
Everett L. Baugh Patented Jan. 9, 1945

2,367,055

UNITED STATES PATENT OFFICE 2,367,055

FUEL SYSTEM

Richard C. Rike and Everett L. Baugh, Dayton, Ohio, assignors to General Motors Corporation, Detroit, Mich., a corporation of Delaware Application August 31, 1942, Serial No. 456,797

1 Claim. (Cl. 158—36.3)

In supplying the engines of motor vehicles with fuel it has been the usual practice to provide a variable stroke diaphragm pump operated by the engine camshaft, the suction stroke of the pump drawing fuel from the fuel reservoir located, in most cases, at the rear of the vehicle, and the discharge stroke delivering fuel to the carburetor. The suction which has been used to draw the fuel to the pump chamber has been the occasion of some vaporizing of the fuel, which interferes with the action of the pump. Various substitutes have been suggested whereby the fuel is forced under pressure from the tank to the carburetor instead of being drawn by suction. For the most part these substitutes involve considerable expense as for example where electrically operated pumps are installed in or adjacent the tank.

It is an object of the present invention to retain the pump adjacent the engine to take advantage of economical mechanical operation by the engine camshaft and at the same time to avoid the use of suction in the conduit carrying fuel from the tank to the pump. Other objects and advantages will appear from the description which follows.

In the drawings accompanying the description:

Fig. 4 is a vertical section through a pump which is used with the system.

Fig. 5 is a section on line 5—5 of Fig. 4.

Fig. 6 is a section on line 6—6 of Fig. 5.

Fig. 7 is a sectional view of one of the valves.

Fig. 8 is a section on line 8—8 of Fig. 5.

Figure 1:
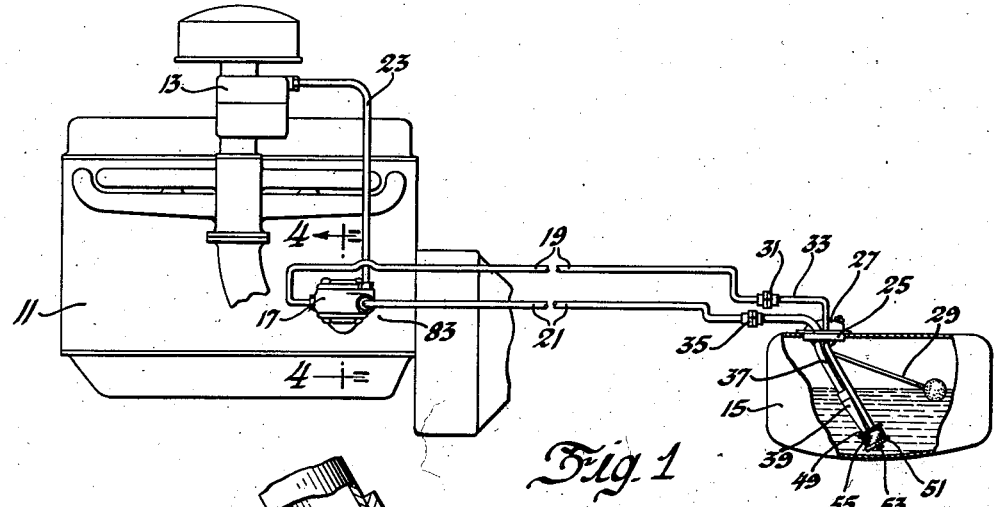
Fig. 1 is a view in elevation of the proposed fuel supply system.
Figure 2:
Fig. 2 is a vertical sectional view of parts within the fuel tank.
Figure 3:
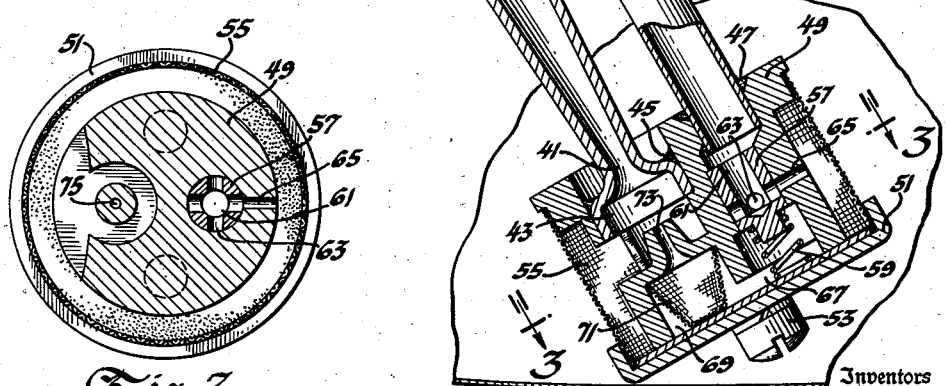
Fig. 3 is a section on line 3—3 of Fig. 2.

Characters of reference on the several figures are used in explanation of the structure and operation. Numeral 11 is used to designate the engine of a motor vehicle. It is supplied with fuel by a carburetor 13, the tank supplying the fuel being at the rear of the vehicle where it is marked by numeral 15. In its broader aspects the invention makes use of a circulating system through which the fuel flows under substantially constant pressure, a circulating pump 17 serving for this purpose. The circulating system includes a pipe 19 connected to the relatively high pressure pump outlet and a pipe 21 communicating with the relatively lower pressure pump inlet. It should be observed, however, that the circulating pump is maintaining a pressure throughout the system and that pipe 21 is not under pressure less than atmospheric. A pipe 23 from the pump takes such of the fuel as is needed to supply the carburetor. The pipes 19 and 21 communicate to complete the circulating system within tank 15 wherein provision is made to add to the supply in the system from the tank a quantity which shall be equivalent to the quantity delivered from the system to the carburetor.

To the top of the tank is secured a plate 25. Such a plate has been heretofore used to mount a rheostat for the fuel gage and the plate 25 is shown equipped with the rheostat 27. The float for controlling the rheostat is shown at 29, although it should be stated that this is no part of the invention. Heretofore the equivalent of plate 25 has been used to carry the fuel suction pipe leading to a position near the bottom of the tank. In the present system pipe 19 is coupled at 31 to a pipe 33 passing through the supporting plate 25 and extended to a position near the bottom of the tank. A coupling 35 connects pipe 21 to a pipe 37 also extending through plate 25. A venturi 39 is coupled as an extension to the end of pipe 37 within the tank. It tapers to a narrow passage at 41 from which it opens into a wider end 43. The end 43 of the venturi and the end of pipe 33 are adjacent each other and are secured as at 45 and 47 to a cage 49. The cage has a cover 51 secured by fastening means 53. It is surrounded by a screen 55. Beneath the opening receiving the end of pipe 33 the cage is formed as a cylindrical guide for a reciprocating plunger 57. The plunger is biased to the position shown by a spring 59 and has an axial bore 61 leading from the top where it is in communication with pipe 33. It also has radial passages 63 by which the axial passage may communicate through a passage 65 in the cage to the space within screen 55. These radial passages open into an enlarged space 67 when the plunger is depressed against the resistance of spring 59. A part of the wall of chamber 67 is cut away so that it is open to chamber 69 containing a filter 71. Fuel entering 69 may pass through filter 71 and through a reduced channel 73 and then may enter the lower end 43 of the venturi.

It will now be understood that the system may be full of fuel which is merely being forced around under pressure by the circulating pump. If, however, the engine suction has drawn fuel from the carburetor the pressure in the pipe 23 may be less than in the system 19—21 thus tending to withdraw some fuel and reduce to some extent the pressure given the system by the pump. In that event an equivalent amount of fuel will enter the system from the tank through screen 55, entering at the contracted region of the venturi 41 where the fluid speed is greatest and the pressure relatively low. The purpose of the plunger 57 is to aid in priming. When there is air in the system and the circulating pump starts to operate the air escapes the passages 63, 65. When the air is driven out, the incompressible liquid under pressure from the pump overcomes spring 59 and the fuel flows into chamber 67.

The pump which it is proposed to use is preferably double acting. It has a housing 81 which is to be clamped to the engine housing 83 in the vicinity of the engine camshaft 85. A pin 87 pivots a lever 89 which is rocked clockwise by a cam 91. A hairpin spring 93 engages an abutment 95 on the housing and the lever 89 to hold the latter against the cam. As lever 89 rotates it engages at 97 a lever 99 also rotatable on pivot pin 87. Upper and lower covers 101 and 103 are secured to the pump housing 81 by fastening means 105, clamping between themselves and the housing diaphragms 107 and 109. As is usual in diaphragm pumps the central region of the diaphragms is reinforced by metal discs such as 111. A tubular stem 113 engages the discs 111 on the adjacent faces of the diaphragms and threaded members 115 pass through the discs on the remote faces and are screwed into threaded passages in stem 113 whereby the diaphragms move in unison. A coil spring 117 is seated on the flat end of lever 99 and engages the inner disc 111 of the upper diaphragm. A spring 119 is seated on a shoulder 121 of the housing. It, too, engages lever 99. Lever 99 has side flanges 123 with rounded faces 125 adapted to engage the inner disc 111 of the lower diaphragm. A shock absorbing spring 127 is positioned between the side flanges 123 of the lever and the inner disc 111 of the lower diaphragm.

The inlet from the pipe 21 is identified on Fig. 5 by numeral 129. After passing through a screen 131 held in position by a spring 133 the fuel passes through a passage 135 and then into a drilled out passage 137 communicating by valves 139 and passages as shown to the chambers above the upper diaphragm and below the lower diaphragm. These chambers 141 and 143 are the pump chambers. On the side of the pump opposite passage 137 is a passage 145 affording communication by way of passages 147 and valves 149 with a pump outlet marked 151 communicating with pipe 19. Referring again to Fig. 8 it will be seen that pipe 23 communicates with space just within the screen 131 by means of a check valve comprising a disc 153 biased by a spring 155 to its closed position shown. When the carburetor needs fuel any pressure differential will cause the check valve to open and such fuel will flow to the carburetor as may be needed, the venturi in the tank becoming at once operative to supply the system with whatever may have been withdrawn. The several valves may be alike and one is illustrated in Fig. 7. A cage 161 seats a spring 163 which biases a valve member 165 to closed position. It will be seen from Fig. 6 that the inlet and outlet valves are reversed in position, valve members 165 of the inlet valve being adjacent each other and the valve members 165 of the outlet valve being remote from each other.

It is believed that the operation of the circulating pump will be readily understood. As the cam 91 rocks lever 89 in a clockwise direction lever 99 is similarly rotated. Its rotation potentially energizes spring 119 which is available for the return stroke. As lever 99 swings upwardly it lifts both diaphragms through the resilient action of spring 117. This upward movement discharges fuel from the upper pump chamber and draws fuel into the lower pump chamber. In the idle part of the cam movement spring 119 acts through lever 99 and particularly its rounded surface 125 to reverse the movements of the diaphragms. Since the pump operates through resilient springs, thus being limited by the pressure against which it can pump, it will maintain a more or less uniform discharge pressure through a wide range of speeds so long as its capacity is not exceeded. Since the pump operates through orifices 73 its discharge will likewise be nearly constant. If upon the upward movement of lever 99 the engine speed is relatively low the diaphragm movement may be considerable in order to maintain the discharge requirements. If, however, the engine speed is high the diaphragms may remain substantially flat and spring 117 may be considerably compressed. Under the latter condition the lever abutment 125 leaves disc 111 and when spring 119 reverses the operation spring 127 cushions the re-engagement of part 125 with the disc. By the above construction it will be seen that the simple mechanical pump operation has been retained and that super atmospheric pressure in the system prevents vapor lock. The only movable parts except for the air bleed device in the tank are the parts of a comparatively simple form of double action diaphragm pump. Both strokes are resiliently made and thus variable. No bypass is needed. The increased frequency resulting from the double stroke is of special importance in a system of this kind for the reason that the suction stroke of one side occurs simultaneously with the pressure stroke of the other; thus, any reduction in pressure occurring due to the intake stroke on one side is overcome by the venturi operating under pressure resulting from the pressure stroke of the other side.

We claim:

A fuel system for an engine having a fuel feed device for supplying fuel to said engine, said system including a fuel reservoir, said system including a pump, mechanism to actuate the pump and a first conduit extending from the high pressure side of the pump to its low pressure side whereby liquid fuel under pressure from the pump may flow through said first conduit, a second conduit connecting said first conduit to said feed device to supply the latter, means constituting an intermediate part of the first conduit and communicating with the fuel in said reservoir, said means being operable to supply the system with a quantity of fuel to offset the fuel delivered to said feed device, said means being a cage adjacent the bottom of said reservoir, said cage having an inlet side and an outlet side, the part of the conduit on the outlet side of the cage being a venturi open at its constricted region to the fuel in the reservoir, and a movable air bleed plunger on the inlet side of the cage, means forming an air vent controlled by said plunger, spring means to bias said plunger to choke the flow of liquid through the cage and to vent air from the conduit and thereafter to move against its spring and to close the air vent and open communication for liquid through the cage.

R. C. RIKE.
EVERETT L. BAUGH.